(12) United States Patent
Hu et al.

(10) Patent No.: US 12,000,555 B2
(45) Date of Patent: Jun. 4, 2024

(54) OPTICAL ASSEMBLY AND VEHICLE LAMP

(71) Applicant: VALEO VISION, Bobigny (FR)

(72) Inventors: Qiang Hu, Hubei (CN); Piao Zhang, Hubei (CN); Anna Gu, Hubei (CN); Liangliang Fei, Hubei (CN); Fang Fang, Hubei (CN)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/764,592

(22) PCT Filed: Oct. 6, 2020

(86) PCT No.: PCT/EP2020/077965
§ 371 (c)(1),
(2) Date: Mar. 29, 2022

(87) PCT Pub. No.: WO2021/073951
PCT Pub. Date: Apr. 22, 2021

(65) Prior Publication Data
US 2022/0349543 A1  Nov. 3, 2022

(30) Foreign Application Priority Data

Oct. 14, 2019 (CN) .......................... 201910972239.8
Oct. 14, 2019 (CN) .......................... 201921710085.7

(51) Int. Cl.
*F21S 41/24* (2018.01)
(52) U.S. Cl.
CPC ..................................... *F21S 41/24* (2018.01)
(58) Field of Classification Search
CPC ..................................................... F21S 41/24
See application file for complete search history.

(56) References Cited

U.S. PATENT DOCUMENTS 10,274,151 B2   4/2019  Faffelberger et al.
10,480,743 B2  11/2019  Gao et al.
(Continued)

FOREIGN PATENT DOCUMENTS

CN      104896396 A    9/2015
DE   102015118511 A1   5/2017
(Continued)

OTHER PUBLICATIONS

European Patent Office, International Search Report and Written Opinion of corresponding International Application No. PCT/EP2020/077965, dated Nov. 10, 2020.
(Continued)

*Primary Examiner* — Julie A Bannan
(74) *Attorney, Agent, or Firm* — Valeo Vision

(57) ABSTRACT

An optical assembly and a vehicle lamp are described. The optical assembly has a main exit direction, and includes a light source, a first light guide element and a second light guide element which are arranged in a superposed fashion in the main exit direction. The light source is allocated to the first light guide element, and the first light guide element has a first light in-coupling region and a first light out-coupling surface, the second light guide element has a second light in-coupling surface and a second light out-coupling surface, with the first light out-coupling surface facing the second light in-coupling surface. A light distribution structure is provided on at least a partial segment of at least one of the first light out-coupling surface and the second light in-coupling surface. The vehicle lamp includes the optical assembly described above.

10 Claims, 2 Drawing Sheets

(56) References Cited

U.S. PATENT DOCUMENTS

| | | | |
|---|---|---|---|
| 2010/0315826 A1* | 12/2010 | Anderson | G02B 6/001 427/163.1 |
| 2013/0003399 A1 | 1/2013 | de Lamberterie | |
| 2014/0247615 A1 | 9/2014 | Fadi et al. | |
| 2018/0274747 A1 | 9/2018 | Wiesner et al. | |
| 2019/0285242 A1 | 9/2019 | Horikawa | |

FOREIGN PATENT DOCUMENTS

| | | | |
|---|---|---|---|
| EP | 1946965 A2 | | 7/2008 |
| EP | 2772683 A1 | | 9/2014 |
| KR | 20170020589 | * | 2/2017 |
| WO | 2016154647 A1 | | 10/2016 |

OTHER PUBLICATIONS

Korean Patent Office, Office Action (with English translation) of corresponding Korean Patent Application No. 2022-7012300, dated Jan. 23, 2024.

* cited by examiner

OPTICAL ASSEMBLY AND VEHICLE LAMP

CROSS-REFERENCE TO RELATED APPLICATIONS

This application is filed under 35 U.S.C. § 371 U.S. National Phase of International Application No. PCT/EP2020/077965 filed Oct. 6, 2020 (published as WO2021073951), which claims priority benefit to Chinese application Nos. 201910972239.8 and 201921710085.7 filed on Oct. 14, 2019, the disclosures of which are herein incorporated by reference in their entirety.

TECHNICAL FIELD

The present invention relates to an optical assembly and a vehicle lamp, the vehicle lamp comprising the optical assembly.

BACKGROUND OF THE INVENTION

Vehicle lamps used in vehicles, in particular motor vehicles, e.g. headlamps and tail lamps, should not only satisfy optical functionality as required by regulation, more and more is being demanded of vehicle lamps in terms of styling. However, a commonly encountered problem is that when a vehicle lamp styling requirement is satisfied, there are many issues standing in the way of achieving a predetermined optical function. For example, in the case where a uniform illumination effect in the form of a long strip is desired, an illumination effect that is not uniform relative to another region often occurs, due to variation in the longitudinal running direction of the long strip, especially at a curved region. One solution is to provide an additional light source at this region, but this causes an undesired increase in manufacturing costs.

BRIEF SUMMARY OF THE INVENTION

An object of the present invention is to provide an optical assembly, which can be manufactured at a favorable cost while satisfying styling requirements and optical functionality, and at the same time can be assembled simply.

According to the present invention, an optical assembly is proposed, the optical assembly having a main exit direction, and comprising a light source, a first light guide element and a second light guide element which are arranged in a superposed fashion in the main exit direction, wherein the light source is allocated to the first light guide element, and the first light guide element has a first light in-coupling region and a first light out-coupling surface, the second light guide element has a second light in-coupling surface and a second light out-coupling surface, the first light out-coupling surface faces the second light in-coupling surface. Here, a light distribution structure is provided on at least a partial segment of at least one of the first light out-coupling surface and the second light in-coupling surface.

In the optical assembly, the light distribution structure provided on the relevant segment of at least one of the first light out-coupling surface and second light in-coupling surface enables the original propagation direction of light to be changed, i.e. the direction in which light is coupled out of the first light out-coupling surface, and the direction in which light is coupled into the second light guide element through the second light in-coupling surface, thereby achieving a desired illumination effect without changing other components. It is not even necessary to increase the power of the light source or increase the number of light sources.

The first light guide element can be a light guide rod, the second light guide element is a light guide block, and a length running direction of the first light guide element corresponds to a length running direction of the second light guide element. Here, the light guide rod has a cross section of constant size in a length direction thereof; for example, the cross section can be circular or oval. Of course, the cross-sectional size of the light guide rod can also become gradually narrower from one end to another end in the length direction thereof, as long as a uniform illumination effect can be achieved in the length direction. The light source allocated to the first light guide element can be arranged at an end of the first light guide element. "Light guide block" can be understood as follows: the thickness thereof in the main exit direction is significantly greater than the outer diameter of the first light guide element, e.g. at least a few centimeters thick. Light from the light source enters the second light guide element after being transmitted through the first light guide element, and is coupled out of the second light guide element. This can reduce the number of light sources required, especially when the styling with the desired illumination effect is of very long length, e.g. more than ten centimeters or longer. Here, the length running directions of the first light guide element and second light guide element are matched to the styling with the desired illumination effect.

The first light guide element and the second light guide element have curved segments, and the light distribution structure is disposed at the curved segment. The curved segment can be understood as being a transitional segment of one segment having a first main extension direction and another segment having a second main extension direction, wherein the main extension directions are different. In particular, segments adjacent to the curved segment are offset in the main exit direction; in this case, when a twisted optical surface, i.e. light in-coupling surface and/or light out-coupling surface, occurs in the curved segment, the curved segment can also be called a twisted segment. The twisted surface will result in light being uncontrolled. Uniformity of exiting light at the curved segment is ensured by means of the light distribution structure.

The segment adjacent to the curved segment can have linear or curved extension. In this case, the main extension direction can be understood as being a linear extension direction or approximately linear extension direction of the segment.

The light distribution structure is a geometric structure that is convex and/or concave from a corresponding surface, in order to change the propagation direction of light, and thereby achieve better light mixing of light in the corresponding light guide element, and finally achieve a uniform light exit effect.

In an embodiment, the geometric structure takes the form of a strip array, a pillow-like array or a combination thereof. For example, the geometric structure has a triangular or arc-shaped cross section. The geometric structure can be disposed on an extended surface of an adjacent segment or on a surface parallel to a surface of an adjacent segment.

In an embodiment, the second light out-coupling surface is provided with a light homogenizing structure, which can take the form of a pillow-like structure.

A side surface, between the second light in-coupling surface and second light out-coupling surface, of the second light guide element is a reflection surface, wherein a light exit structure with a predetermined pattern is provided on the side surface. In this case, light can exit through the light exit structure, thereby presenting an additional ornamental light exit effect, and thus enriching the illumination effect.

The present invention further proposes a vehicle lamp, comprising the optical assembly as described above.

Through the technical solution proposed in the present invention, the propagation direction of light is changed at least once via the light distribution structure provided, and better mixing and homogenization of light are thereby achieved. This light distribution structure is formed when the first light guide element and second light guide element are injection-molded, and there is no need to change the structure of other components. Thus, cost-effective manufacture is achieved.

BRIEF DESCRIPTION OF THE DRAWINGS

The present invention is expounded in greater detail below with the aid of the drawings. In the drawings.

DETAILED DESCRIPTION OF THE INVENTION

Embodiments of the present invention will be described demonstratively below. As those skilled in the art should realize, the embodiments described can be amended in various ways without departing from the concept of the present invention. Thus, the accompanying drawings and the Description are in essence demonstrative and non-limiting. In the following text, identical drawing reference labels generally indicate functionally identical or similar elements.

Figure 1:
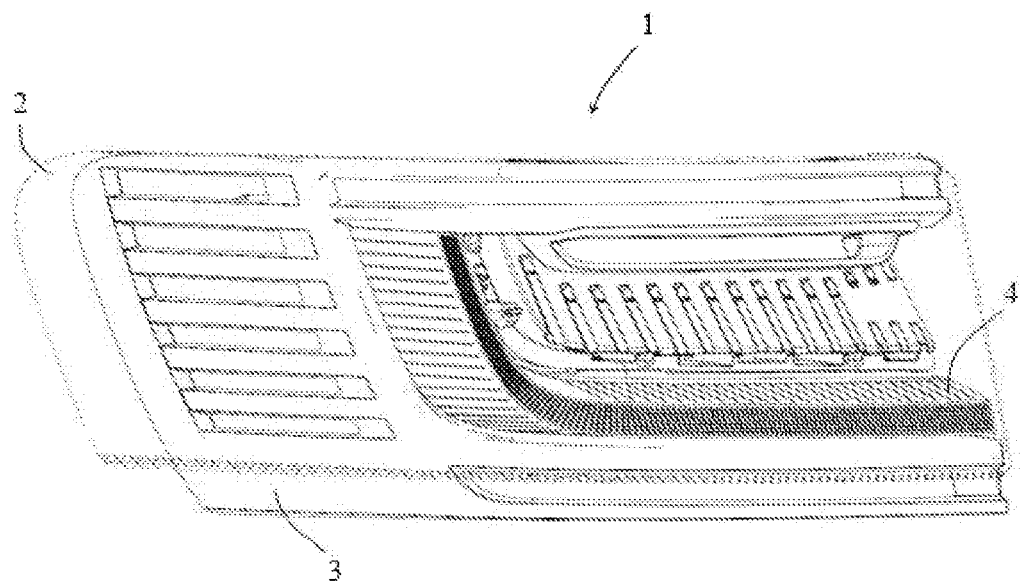
FIG. 1 shows a schematic drawing of a vehicle lamp including the optical assembly according to the present invention.

FIG. 1 shows a vehicle lamp 1, comprising an outer lens 2, and a bezel 3 and an optical assembly 4 which are arranged behind the outer lens 2. A through-hole for the optical assembly 4 is provided in the bezel 3; at least a light exit region of the optical assembly 4 can pass through the through-hole, such that the region is visible from the outside when the vehicle lamp is installed in a vehicle. It must be explained that only those parts of the vehicle lamp which are important for expounding the present invention are shown here; other components are not shown, e.g. a vehicle lamp housing, wiring harness, etc.

Figure 2:
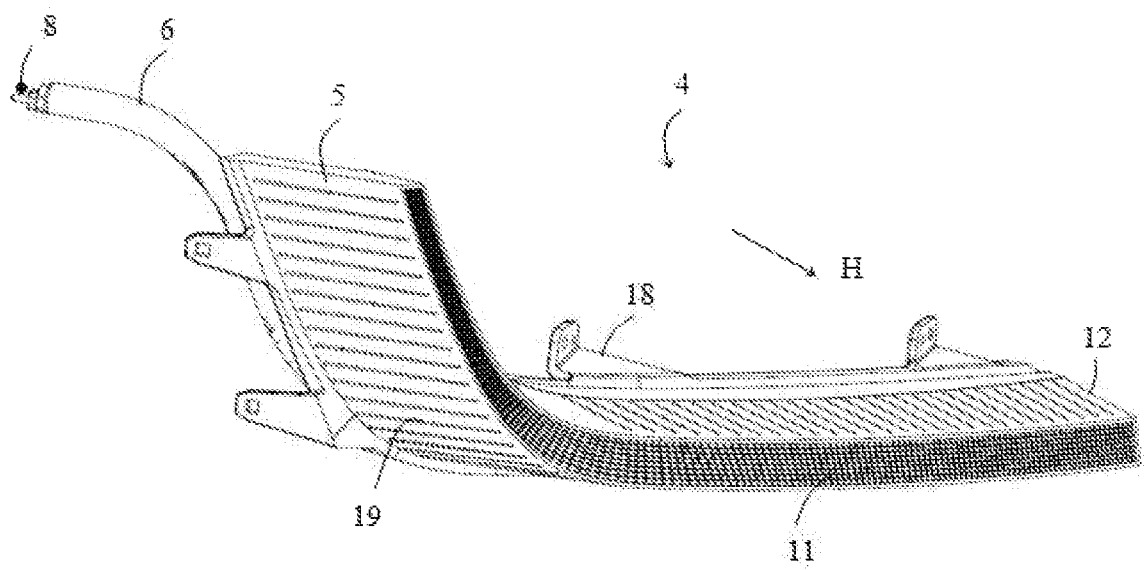
FIG. 2 shows a schematic drawing of the optical assembly according to the present invention.
Figure 3:
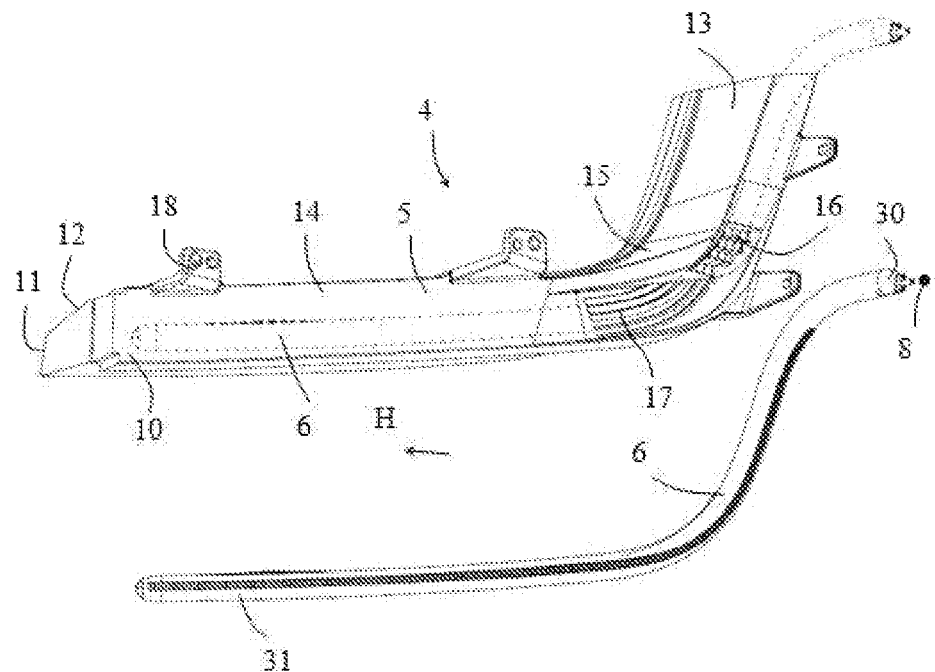
FIG. 3 shows another schematic drawing of the optical assembly according to the present invention.
Figure 4:
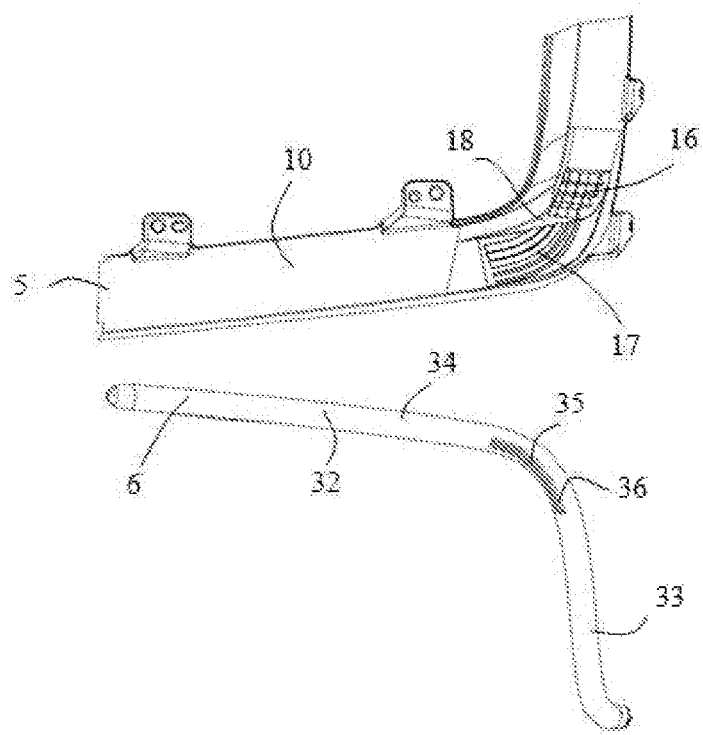
FIG. 4 shows another schematic drawing of the optical assembly according to the present invention.

The optical assembly 4 in the vehicle lamp in FIG. 1 is shown in different drawings in FIGS. 2-4, wherein FIG. 2 shows a front view of the optical assembly 4; FIGS. 3 and 4 show rear views of the optical assembly 4. In order to show the relevant structure more clearly, one element of the optical assembly 4 of FIG. 3 has been shifted, and this element has been flipped over in FIG. 4.

The optical assembly 4 comprises a first light guide element 6 and a second light guide element 5 arranged in a superposed fashion in a main exit direction H of light emitted by the optical assembly. The main exit direction can be determined according to the particular application of the optical assembly. For example, when the optical assembly is used for a vehicle lamp, e.g. a headlamp or tail lamp of a vehicle, the main exit direction corresponds to a longitudinal direction of the vehicle. The optical assembly 4 further comprises a light source 8 allocated to the first light guide element 6.

The first light guide element 6 takes the form of an elongated light guide rod, which has a circular cross section, and the cross sectional dimensions are constant in size in a length direction. The light source 8 is arranged at an end of the first light guide element 6. Only the light source is shown here; a support for bearing the light source, e.g. a printed circuit board, and an associated heat sink, are not shown. Of course, the light source can also be arranged on the heat sink directly. The light source can be a light emitting diode, a color thereof being selected as required. Alternatively, the first light guide element 6 can have a gradually changing cross-sectional size in the length direction thereof. The cross section is also not limited to being circular as mentioned above.

The first light guide element 6 has a first light in-coupling region 30 disposed at an end, a first light out-coupling surface 32 and a light deflection surface 31, wherein light that is coupled into the first light guide element 6 via the first light in-coupling region 30 is reflected towards the first light out-coupling surface 32 by the light deflection surface 31, and finally exits through the first light out-coupling surface 32 towards the second light guide element 5. The light deflection surface 31 takes the form of an optical tooth array, being distributed on a predetermined length segment in a length running direction of the first light guide element 6, and can change a reflection direction of arriving light such that the reflected light, after arriving at the first light out-coupling surface 32, can leave the first light guide element 6 at this position.

The second light guide element 5 is arranged in front of the first light guide element 6 in the main exit direction H. The second light guide element 5 has a second light in-coupling surface 10 and a second light out-coupling surface 11; the second light in-coupling surface 10 faces the first light out-coupling surface 32. The second light in-coupling surface 10 and second light out-coupling surface 11 define the thickness of the second light guide element 5. The second light guide element 5 takes the form of a light guide block, and the thickness thereof is significantly greater than the cross-sectional dimensions of the first light guide element 6, e.g. 30 mm or thicker. A side surface 12 bridging together the second light in-coupling surface 10 and second light out-coupling surface 11 is a light reflection surface. When light that has entered the second light guide element 5 via the second light in-coupling surface 10 arrives at the side surface 12, it experiences total reflection at this position, and after being reflected, continues to propagate towards the second light out-coupling surface 11.

To achieve a richer illumination effect, a light exit structure with a predetermined pattern can be provided on the side surface 12, such that light can exit through the light exit structure, e.g. a point array 19 visible in FIGS. 1 and 2, which takes the form of a strip array of convex or concave points.

The second light guide element 5 also has a fixing structure 18, in order to fix it on a support, e.g. the bezel 3. The fixing structure 18 interacts with a cooperating fixing structure that is constructed on the support but not shown; for example, a fixed connection is established by means of engagement, threaded connection or bonding, etc. For this purpose, the fixing structure 18 for example takes the form of an engaging tongue or has a through-hole for leading a screw through. Preferably, the fixing structure 18 is integrally formed at a predetermined region of the second light guide element 5. Of course, the first light guide element 6 also has a corresponding fixing structure, in order to occupy the correct position relative to the light source and second light guide element.

The length running direction of the first light guide element 6 corresponds to a length running direction of the second light guide element 5; thus, the first light out-coupling surface 32 and second light in-coupling surface 10 which are facing each other enable light to arrive at the second light guide element via the first light guide element as well as possible.

The length running directions of the first light guide element 6 and second light guide element 5 can be designed according to a desired illumination effect. For this purpose, they can take the form of a straight line, a curved line or a combination thereof. In order to further improve the light exit effect, an additional light distribution structure can be provided on the relevant surface in at least one of the first light guide element 6 and second light guide element 5, to further increase the uniformity of exiting light.

The drawings of FIGS. 3 and 4 show that light distribution structures are provided on partial segments of the first light out-coupling surface 32 and second light in-coupling surface 10, which face each other, of the first light guide element 6 and second light guide element 5. In order to better display the light distribution structures, in FIG. 3, the first light guide element 6 has been translated downwards relative to a position, indicated by a dotted line, that should actually be occupied by the first light guide element 6; and in FIG. 4, the first light guide element 6 has been flipped through 180 degrees.

In the example shown, the first light guide element 6 and second light guide element 5 both have a curved segment. Specifically, the first light guide element 6 has a first segment 33, a second segment 34, and a third segment 35 arranged therebetween, wherein a main extension direction of the first segment 33 is different from a main extension direction of the second segment 34, and the third segment 35 is a curved segment which bridges them together. The second light guide element 5 has a fourth segment 13, a fifth segment 14, and a sixth segment 15 arranged therebetween, wherein main extension directions of the fourth segment 13 and fifth segment 14 are different, and the sixth segment 15 is a curved segment which bridges them together.

It can be seen from FIG. 3 that the second light guide element 5 is provided at the sixth segment thereof with a first light distribution structure on the second light in-coupling surface 10; the first light distribution structure takes the form of a combination of a pillow-like array 16 and a first strip array 17. Here, a light exit surface of the smallest block-like constituent unit of the pillow-like array 16 can be a convex surface or concave surface, and a cross section of the smallest strip-like constituent unit of the strip array 17 can be triangular, circular or another suitable form.

It can be seen from FIG. 4 that the first light guide element 6 is provided at the third segment 35 thereof with a second light distribution structure on the first light out-coupling surface 32; the second light distribution structure takes the form of a second strip array 36, and a cross section of the smallest strip-like constituent unit of the strip array can likewise be triangular, circular or another suitable form. The second light distribution structure disposed on the first light guide element faces the first light distribution structure disposed on the second light guide element.

Although particular forms of the light distribution structures disposed on the two light guide elements are shown in FIGS. 3 and 4, it must be understood that the light distribution structures can be set according to specific needs. For example, light distribution structures all taking the form of a pillow-like array or strip array can be provided on the second light guide element, or a light distribution structure taking the form of a pillow-like array can be provided on the first light guide element. If necessary, the abovementioned light distribution structure can be provided on just one of the two light guide elements, as long as uniformity of exiting light can be satisfied.

Especially when the first light out-coupling surface 32 of the third segment 35 of the first light guide element 6 and the second light in-coupling surface 10 of the sixth segment 15 of the second light guide element 5 are twisted surfaces, the abovementioned light distribution structures are provided on both of the light guide elements, thereby ensuring the uniformity of exiting light at the curved segments. This is because, compared to non-twisted surfaces, the propagation direction of light is more uncontrolled after passing through a twisted surface, and it is even possible that the light will not reach the light out-coupling surface as a result, thereby adversely affecting the light exit effect. Preferably, a running direction of the light distribution structure disposed on the second light guide element 5 is matched to a running direction of a segment adjacent to the curved segment. For example, the smallest strip-like constituent unit of the strip array 17 can be regarded as an extension of the fifth segment 14 in an extension direction thereof, and surfaces of each row of units in the pillow-like array 16 are parallel to the light in-coupling surface of the fourth segment 13 overall. Thus, a step 18 occurs in a region provided with the light distribution structure of the curved segment of the second light guide element, as can be seen especially clearly from FIG. 4.

It must be explained that although just one curved segment is shown in the drawings, multiple curved segments can also occur, especially twisted segments having twisted surfaces, with light distribution structures being correspondingly provided at this region.

To further improve the uniformity of exiting light, a light homogenizing structure can be provided at the light out-coupling surface of the second light guide element, e.g. a pillow-like structure array.

The first light guide element and second light guide element can be injection-molded from a light-transmitting material, e.g. polycarbonate, poly(methyl methacrylate), etc. This facilitates cost-effective manufacture.

The optical assembly can be used for a vehicle lamp of a vehicle, e.g. for a daytime running lamp, brake lamp, indicator lamp, etc. The light emission color and power of the light source are chosen according to the type of vehicle lamp used.

The present invention, instead of being limited to the above-described structure, can also have other variants. While the present invention has been described above by a limited number of embodiments, benefiting from the present invention, those of ordinary skill in the art can design other embodiments without departing from the scope of protection of the present invention. Thus, the scope of protection of the present invention should be defined by the attached claims alone.

What is claimed is:

1. An optical assembly of a vehicle lamp, comprising:
a light source allocated to a first light guide, where the first light guide takes a form of an elongate rod; and a second light guide where the second light guide is a light guide block, and where the thickness of the light guide block is greater than a cross-sectional dimension of the first light guide;

where the first light guide extends along the second light guide in a superposed fashion and extends along a number of integrally formed fixing structure with the second light guide;

the first light guide including a first light in-coupling region and a first light out-coupling surface;

the second light guide including a second light in-coupling surface and a second light out-coupling surface, where the first light out-coupling surface faces the second light in-coupling surface;

where the first light guide and the second light guide include a number of curved segments;

where a light distribution structure is provided on a curved partial segment of at least one of the first light out-coupling surface and the second light in-coupling surface; and wherein the curved partial segment is offset in a main axis direction and the first light guide is partially nested within the second light guide.

2. The optical assembly according to claim 1, wherein a length running direction of the first light guide corresponds to a length running direction of the second light guide.

3. The optical assembly according to claim 1, wherein the second light out-coupling surface includes a light homogenizing structure.

4. The optical assembly according to claim 1, wherein the light distribution structure includes a geometric structure that is convex or concave from a corresponding surface.

5. The optical assembly according to claim 4, wherein the geometric structure takes the form of a strip array, a pillow-like array or a combination thereof.

6. The optical assembly according to claim 4, wherein the geometric structure has a triangular or arc-shaped cross section.

7. The optical assembly according to claim 4, wherein the geometric structure is disposed on an extended surface of an adjacent segment or on a surface parallel to a surface of an adjacent segment.

8. The optical assembly according to claim 1, wherein a side surface between the second light in-coupling surface and second light out-coupling surface of the second light guide includes a reflection surface provided on the side surface.

9. An optical assembly of a vehicle lamp, comprising:
a light source allocated to a first light guide, where the first light guide takes a form of an elongate rod; and
a second light guide where the second light guide is a light guide block, and where the thickness of the light guide block is greater than a cross-sectional dimension of the first light guide;

where the first light guide extends along the second light guide in a superposed fashion and extends along a number of integrally formed fixing structure with the second light guide;

the first light guide including a first light in-coupling region and a first light out-coupling surface;

the second light guide including a second light in-coupling surface and a second light out-coupling surface, where the first light out-coupling surface faces the second light in-coupling surface; and where a light distribution structure is provided on a curved partial segment of at least one of the first light out-coupling surface and the second light in-coupling surface;

where the first light guide and the second light guide include corresponding curved segments; and where the light distribution structure is disposed on the first light guide's corresponding curved segment, which is offset from the second light guide in a main exit direction.

10. An optical assembly of a vehicle lamp, comprising:
a light source allocated to a first light guide, where the first light guide takes a form of an elongate rod; and
a second light guide where the second light guide is a light guide block, and where the thickness of the light guide block is greater than a cross-sectional dimension of the first light guide;

where the first light guide extends along the second light guide in a superposed fashion and extends along a number of integrally formed fixing structure with the second light guide;

the first light guide including a first light in-coupling region and a first light out-coupling surface;

the second light guide including a second light in-coupling surface and a second light out-coupling surface, where the first light out-coupling surface faces the second light in-coupling surface; and where a light distribution structure is provided on a partial segment of at least one of the first light out-coupling surface and the second light in-coupling surface; and wherein a side surface between the second light in-coupling surface and second light out-coupling surface of the second light guide includes a reflection surface and a light exit structure with a predetermined pattern provided on the side surface.

* * * * *